Sept. 3, 1957 H. BOUWMAN ET AL 2,805,281

RECEIVER FOR FREQUENCY-SHIFT TELEGRAPHY

Filed Nov. 16, 1953

INVENTORS
HAYE BOUWMAN
HUGO KOPPE

BY [signature]

AGENT

United States Patent Office 2,805,281

Patented Sept. 3, 1957

2,805,281

RECEIVER FOR FREQUENCY-SHIFT TELEGRAPHY

Haye Bouwman and Hugo Koppe, Hilversum, Netherlands, assignors, by mesne assignments, to North American Philips Company, Inc., New York, N. Y., a corporation of Delaware Application November 16, 1953, Serial No. 392,432

Claims priority, application Netherlands November 17, 1952

3 Claims. (Cl. 178—66)

The invention relates to receivers for frequency-shift telegraphy, for example, for the reception of Morse-signals, telex-signals or the like, characterised by frequency shifts of an incoming carrier wave, the demodulated signals being supplied through series capacitors to peak voltage rectifiers passing current in opposite directions and having a common output resistor between the junctions of the series capacitors and the peak-voltage rectifiers, a central tapping of this output resistor being connected to the input of a pulse repeater. Such a frequency-shift telegraphy receiver has the advantage that distortion of the telegraphy signals reproduced by the pulse repeater due to variations of the direct-voltage level of the demodulated signals is reduced materially. The variations of the direct-voltage level of the demodulated signals may, for example, be due to variations in the transmitter frequency or in the tuning of the receiver.

It has been found that during signalling intervals, in which either the operative frequency or the closed-circuit frequency prevails, the said telegraphy receiver becomes particularly sensitive to interference voltages.

According to the invention this difficulty is overcome by shunting each of the series capacitors by means of a rectifier passing current in a direction such that a reversal of polarity of the detection voltage across the series capacitors is prevented.

Each of the rectifiers shunting the series capacitors preferably has a bias voltage from a direct-voltage source in order to fix a minimum bias voltage across the respective series capacitors.

In order that the invention may be readily carried into effect, it will now be described with reference to the accompanying drawing.

Figure 1:
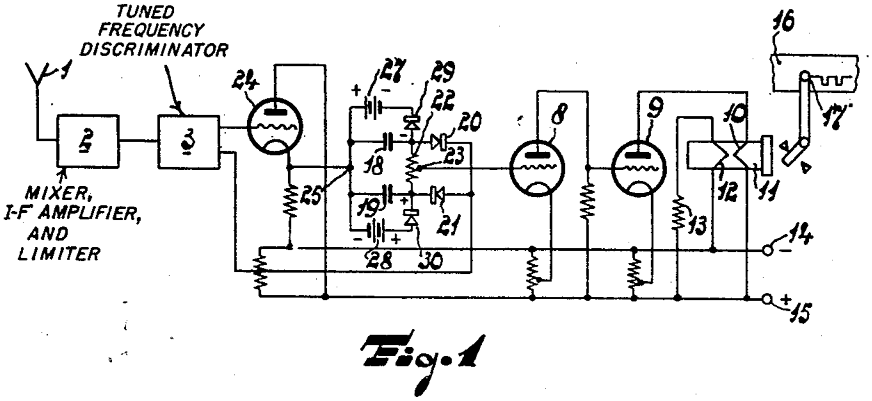

Fig. 1 shows a frequency-shift telegraphy receiver according to the invention and Figs. 2*a* to 2*c* show a few voltage-time diagrams to explain the operation of the telegraphy receiver shown in Fig. 1.

In the frequency-shift telegraphy receiver shown in Fig. 1 the oscillations received through the aerial 1 are supplied to a stage 2, comprising in succession a high-frequency amplifier, a mixing stage having a local oscillator connected thereto, an intermediate-frequency amplifier and an amplitude limiter. The amplitude-limited intermediate-frequency oscillations of the amplitude limiter, varied in frequency in accordance with the signal modulations control a tuned frequency discriminator 3 of the bandpass filter type, which produces a positive or a negative direct voltage according to whether the operative frequency or the closed-circuit frequency is received.

Figure 2:
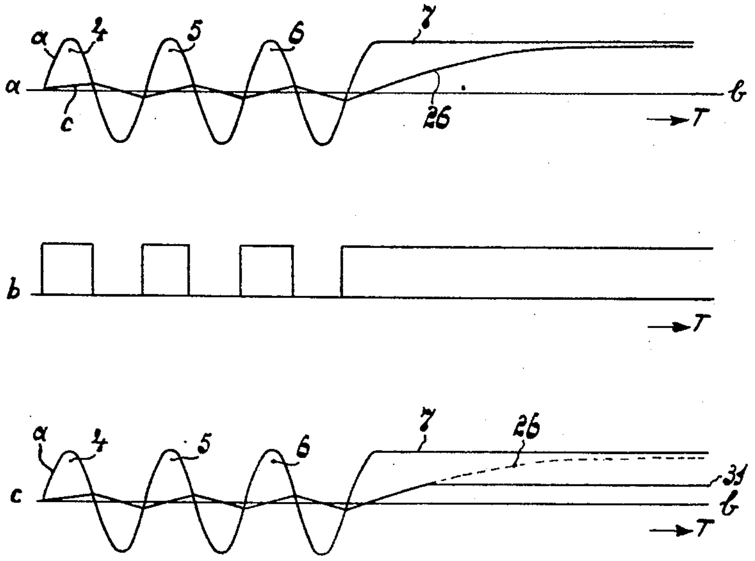

In the time diagram shown in Fig. 2 the curve *a* indicates the course of the signals derived from the frequency discriminator in a definite time, these signals comprising, for example, three signs 4, 5 and 6 and a signalling interval 7, in which the operative frequency is received.

The demodulated signals thus received are supplied through a device to be described hereinafter to a direct-voltage amplifier comprising tubes 8 and 9. The anode circuit of the direct-voltage amplifying tube 9 includes an energizing circuit 10 of a polarized relay 11, which comprises a further energizing circuit 12, which is connected in series with a series resistor 13 to the negative and the positive terminals 14 and 15 respectively of an anode voltage source. The polarized relay 11 operates as a pulse repeater and controls, as is indicated diagrammatically, a writing device 17 arranged over a recording belt 16 in order to reproduce the incoming signals.

In the telegraphy receiver shown the polarized relay 11 is adjusted, in order to obtain a correct reproduction of the transmitted telegraphy signs, in a manner such that it responds each time approximately at half the peak value up to the full peak value of the demodulated signals, indicated in the time diagram of Fig. 2*a* by the straight line *b*. Then the telegraphy signs recorded on the belt 16 exhibit the time character indicated in Fig. 2*b*.

In order to avoid distortion of the recorded signs due to variations in the direct-current level of the signals derived from the frequency discriminator 3, these signals are supplied through series capacitors 18, 19 to peak voltage rectifiers 20, 21, passing current in opposite directions, and having a common output resistor 22 between the junctions of the series capacitors 18, 19 and the peak-voltage rectifiers 20, 21, whilst a central tapping 23 of this output resistor 22 is connected to the control-grid of the direct-voltage amplifying tube 8.

At the occurrence of a positive output voltage across the frequency discriminator 3, the series capacitor 18 is charged up to the peak value of this output voltage via the rectifier 20, which is then conductive, whereas the other rectifier 21 is cut off at this polarity of the output voltage. Simultaneously with the charging described above, part of the charge of the capacitor 18 flows via the resistor 22 to the capacitor 19 with a charging rate determined by the time constant of the circuit 18, 19, 22, this time constant being chosen to exceed the duration of the longest sign. At a negative output voltage of the frequency discriminator 3 the capacitor 19 is charged via the rectifier 21, which is then conductive; the rectifier 20 is then cut off.

The time constant of the charging circuits of the capacitors 18 and 19 are shorter than the duration of the shortest sign, in order to charge the said capacitors up to the full peak value of the sign during the time of one sign. This short charging time constant is obtained by supplying the output voltage of the frequency discriminator 3 through a cathode amplifier 24 to the capacitors 18 and 19.

Owing to the described operation of the circuit 18 to 23 a time-varying voltage, the course of which is indicated by the curve *c* in Fig. 2*a* is produced between the junction 25 of the capacitors 18 and 19 and the central tapping 23 of the resistor 22. The control-grid of the direct-voltage amplifying tube 8 has supplied to it a voltage which is equal to the output voltage of the cathode amplifier 24 (curve *a*) minus the voltage difference between the junction 25 of the capacitors and the tapping 23 of the output resistor 22 (curve *c*). Since the level of the curve *c* varies with the direct-voltage level of the output voltage of the cathode amplifier, any direct-voltage variations of this output voltage are completely compensated.

In the arrangement shown the polarised relay 11 responds at the instants when the output voltage of the cathode amplifier 24 (curve *a*) is approximately equal to the amplitude of the voltage indicated by curve *c*.

If the signalling interval indicated in Fig. 2*a* occurs, the circuit shown becomes particularly sensitive to interference voltages. During this signalling interval the voltage at the capacitor 18 is kept by the rectifier 20, which is then conductive, at the peak value of the positive output voltage of the cathode amplifier 24; the rectifier 21 is then cut off, whilst the capacitor 19 is charged, via the series resistor, slowly up to the voltage of the capacitor 18. Consequently a voltage indicated by the curve 26 is produced between the junction 25 of the capacitors and the tapping 23, this voltage increasing along an e-curve up to the peak value of the output voltage 7 of the cathode amplifier 24. Since the polarised relay responds at a voltage at which the output voltage of the cathode amplifier 24 (curve *a*) is approximately equal to the voltage between the points 23 and 25 (curve *c*), the circuit shown is particularly sensitive to interference voltages in this condition.

According to the invention this undesirable condition is avoided by shunting each of the series capacitors 18, 19 by means of a rectifier 29 and 30 respectively, passing the current in a direction such that a reversal of polarity of the detection voltage across the series capacitors is prevented. In the embodiment shown a direct-voltage source 27 and 28 respectively is connected in series with each of the rectifiers in order to fixe a minimum bias voltage across the series capacitors 18 and 19.

If in this circuit the signalling interval 7 occurs (cf. Fig. 2*c*) the capacitor 19 is charged up to the voltage of the bias voltage source 28. The rectifier 30 then becomes conductive, after which the voltage across the capacitor 19 is fixed by the bias voltage source 28. The voltage between the points 25 and 23 can no longer increase up to the output voltage of the cathode amplifier 24, and it is kept at the value indicated by the straight line 31 in Fig. 2*c*. This means that the undesirable condition described above is avoided.

Particularly favourable results have been obtained in practice by choosing the bias voltage to be approximately equal to three quarters of the normal peak detection voltage.

We claim:

1. In a receiver wherein frequency-shift telegraphy signals are demodulated, the combination comprising first and second capacitors, first and second peak-voltage rectifiers, means to apply the demodulated signals to said first capacitor in series with said first rectifier, means to apply said demodulated signals to said second capacitor in series with said second rectifier, said second rectifier being connected to pass signal current in a direction opposed to that of said first rectifier, an output resistor connected between the junction of said first capacitor and rectifier and the junction of said second capacitor and rectifier, a pulse repeater coupled to a tap on said resistor to reproduce the pulse developed thereacross, and third and fourth rectifiers connected across said first and second capacitors respectively to prevent a reversal in the polarity of the detected voltage thereacross.

2. A receiver, as set forth in claim 1, further comprising means including a direct-voltage source for biasing said third and fourth rectifiers to fix minimum bias voltages across said capacitors.

3. A receiver, as set forth in claim 2, wherein said bias voltage is substantially equal to three-quarters of the normal detection voltage across said capacitors.

References Cited in the file of this patent

UNITED STATES PATENTS 2,222,759 Burnside -------------- Nov. 26, 1940